United States Patent
Bodnar et al.

(10) Patent No.: US 6,275,831 B1
(45) Date of Patent: Aug. 14, 2001

(54) DATA PROCESSING ENVIRONMENT WITH METHODS PROVIDING CONTEMPORANEOUS SYNCHRONIZATION OF TWO OR MORE CLIENTS

(75) Inventors: Eric O. Bodnar, Capitola; Chris LaRue; Bryan Dube, both of Santa Cruz; Shekhar Kirani, San Jose; Sethuraman Suresh, Santa Cruz, all of CA (US)

(73) Assignee: Starfish Software, Inc., Scotts Valley, CA (US)

( * ) Notice: Subject to any disclaimer, the term of this patent is extended or adjusted under 35 U.S.C. 154(b) by 0 days.

(21) Appl. No.: 09/136,212

(22) Filed: Aug. 18, 1998

Related U.S. Application Data

(60) Provisional application No. 60/069,731, filed on Dec. 16, 1997, provisional application No. 60/094,972, filed on Jul. 31, 1998, and provisional application No. 60/094,824, filed on Jul. 31, 1998.

(51) Int. Cl.[7] .................................................. G06F 17/30
(52) U.S. Cl. .......................................... 707/201; 709/220
(58) Field of Search .................................. 707/201, 202, 707/203, 8–10; 709/220, 248

(56) References Cited

U.S. PATENT DOCUMENTS

| | | | |
|---|---|---|---|
| 4,769,796 | 9/1988 | Levine | 368/29 |
| 4,866,611 | 9/1989 | Cree et al. | 708/112 |
| 4,881,179 | 11/1989 | Vincent | 358/1.14 |
| 4,977,520 | 12/1990 | McGaughey, III et al. | 345/330 |
| 5,113,380 | 5/1992 | Levine | 370/291 |
| 5,224,212 | 6/1993 | Rosenthal et al. | 705/9 |
| 5,392,390 | 2/1995 | Crozier | 345/335 |
| 5,442,783 | 8/1995 | Oswald et al. | 705/9 |
| 5,519,606 | 5/1996 | Frid-Nielsen et al. | 705/9 |
| 5,666,530 | 9/1997 | Clark et al. | 707/201 |
| 5,666,553 | 9/1997 | Crozier | 707/540 |
| 5,684,984 | * 11/1997 | Jones et al. | 707/10 |
| 5,684,990 | * 11/1997 | Boothby | 707/203 |
| 5,701,423 | 12/1997 | Crozier | 345/335 |
| 5,710,922 | 1/1998 | Alley et al. | 707/201 |
| 5,727,202 | 3/1998 | Kucala | 707/10 |
| 5,729,735 | 3/1998 | Meyering | 707/10 |
| 5,758,150 | * 5/1998 | Bell et al. | 707/10 |
| 5,758,355 | 5/1998 | Buchanan | 707/201 |
| 5,778,346 | 7/1998 | Frid-Nielsen et al. | 705/9 |
| 5,778,389 | 7/1998 | Pruett et al. | 707/204 |
| 5,832,487 | 11/1998 | Olds et al. | 707/10 |
| 5,845,293 | 12/1998 | Veghte et al. | 707/202 |
| 5,926,816 | * 7/1999 | Bauer et al. | 707/8 |

* cited by examiner

Primary Examiner—Kim Vu
Assistant Examiner—Jean Bolte Fleurantin
(74) Attorney, Agent, or Firm—John A. Smart

(57) ABSTRACT

A synchronization system providing multi-client synchronization is described. By storing the data that is actually being synchronized (i.e., storing the actual physical body of a memo, for instance) inside an extra database, "Grand Unification Database" (GUD), (or by specially-designated client data set) under control of a central or core synchronization engine, rather than transferring such data on a point-to-point basis, the system of the present invention provides a repository of information that is available at all times and does not require that any other synchronization client (e.g., PIM client or hand-held device) be connected. The GUD provides a super-set of the other client data sets. Therefore, if the user now includes an additional client, such as a server computer storing user information, the synchronization system has all the information necessary for synchronizing the new client, regardless of whether any of the other clients are currently available. The system can, therefore, correctly propagate information to any appropriate client without having to "go back" to (i.e., connect to) the original client from which that data originated.

39 Claims, 7 Drawing Sheets

DATA PROCESSING ENVIRONMENT WITH METHODS PROVIDING CONTEMPORANEOUS SYNCHRONIZATION OF TWO OR MORE CLIENTS

RELATED APPLICATIONS

The present application is related to and claims the benefit of priority from the following commonly-owned, co-pending U.S. provisional patent applications: Ser. No. 60/069,731, filed Dec. 16, 1997, and entitled Data Processing Environment with Synchronization Methods Employing a Unification Database; Ser. No. 60/094,972, filed Jul. 31, 1998, and entitled System and Methods for Synchronizing two or more Datasets; and Ser. No. 60/094,824, filed Jul. 31, 1998, and entitled Data Process Environment with Methods Providing Contemporaneous Synchronization of two or more Clients. The disclosures of the foregoing are hereby incorporated by reference in their entirety, including any appendices or attachments thereof, for all purposes. The present application is also related to the following concurrently-filed, commonly-owned U.S. patent application, the disclosures of which are hereby incorporated by reference in their entirety, including any appendices or attachments thereof, for all purposes: Ser. No. 09/136,215 filed Aug. 18, 1998, and entitled System and Methods for Synchronizing two or more Datasets. The present application is also related to the following commonly-owned, co-pending U.S. patent applications, the disclosures of which are hereby incorporated by reference in their entirety, including any appendices or attachments thereof, for all purposes: Ser. No. 08/609,983, filed Feb. 29, 1996, and entitled System and Methods for Scheduling and Tracking Events Across Multiple Time Zones; Ser. No. 09/020,047, filed Feb. 6, 1998, and entitled Methods for Mapping Data Fields from one Data set to Another in a Data Processing Environment, and Ser. No. 08/923,612, filed Sep. 4, 1997, and entitled System and Methods for Synchronizing Information among Disparate Datasets.

COMPUTER PROGRAM LISTING APPENDIX

The file of this patent contains a computer program listing appendix submitted on one compact disc, including a duplicate compact disc, in a file named "APPENDIX.TXT", having a date of creation of May 7, 2001 and a size of 28,286 bytes. The contents of the compact disc are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to management of information or sets of data (i.e., "data sets") stored on electronic devices and, more particularly, to a system implementing methods for maintaining synchronization of disparate data sets among a variety of such devices, particularly synchronizing three or more devices at a time.

With each passing day, there is ever increasing interest in providing synchronization solutions for connected information appliances. Here, the general environment includes "appliances" in the form of electronic devices such as cellular phones, pagers, hand-held devices (e.g., PalmPilot™ and Windows™ CE devices), as well as desktop computers and the emerging "NC" device (i.e., a "network computer" running, for example, a Java virtual machine or a browser).

As the use of information appliances is ever growing, often users will have their data in more than one device, or in more than one desktop application. Consider, for instance, a user who has his or her appointments on a desktop PC (personal computer) but also has a battery-powered, hand-held device for use in the field. What the user really wants is for the information of each device to remain synchronized with all other devices in a convenient, transparent manner. Still further, the desktop PC is typically connected to a server computer, which stores information for the user. The user would of course like the information on the server computer to participate in the synchronization, so that the server also remains synchronized.

A particular problem exists as to how one integrates disparate information—such as calendaring, scheduling, and contact information—among multiple devices, especially three or more devices. For example, a user might have a PalmPilot ("Pilot") device, a REX™ device, and a desktop application (e.g., Starfish Sidekick running on a desktop computer). Currently, in order to have all three synchronized, the user must follow a multi-step process. For instance, the user might first synchronize data from the REX™ device to the desktop application, followed by synchronizing data from the desktop application to the Pilot device. The user is not yet done, however. The user must synchronize the Pilot back to the REX™ device, to complete the loop. Description of the design and operation of the REX™ device itself (available as Model REX-3, from Franklin Electronic Publishers of Burlington, N.J.) is provided in commonly-owned U.S. patent application Ser. No. 08/905,463, filed Aug. 4, 1997, and entitled, User Interface Methodology for Microprocessor Device Having Limited User Input, the disclosure of which is hereby incorporated by reference.

Expectantly, the above point-to-point approach is disadvantageous. First, the approach requires user participation in multiple steps. This is not only time consuming but also error prone. Further, the user is required to purchase at least two products. Existing solutions today are tailored around a device-to-desktop PIM (Personal Information Manager) synchronization, with no product capable of supporting concurrent synchronization of three or more devices. Thus for a user having three or more devices, he or she must purchase two or more separate synchronization products. In essence, existing products to date only provide peer-to-peer synchronization between two points, such as between point A and point B. There is no product providing synchronization from, say, point A to point B to point C, all at the same time. Instead, the user is required to perform the synchronization manually by synchronizing point A to point B, followed by synchronizing point B to point C, then followed by point C back to point A, for completing the loop.

As a related disadvantage, existing systems adopt what is, in essence, an approach having a "hard-coded" link for performing synchronization for a given type of data. Suppose, for example, that a user desires to update his or her synchronization system for now accommodating the synchronization of e-mail data (e.g., Microsoft® Outlook e-mail). With existing synchronization products, the user cannot simply plug in a new driver or module for supporting this new data type. To the point, existing products today do not provide a generic framework into which data type-specific modules may plug into. As a result, these products are inflexible. In the event that the user encounters a new type of data for which synchronization is desired, he or she is required to update all or substantially all of the synchronization product. The user cannot simply plug in a driver or module for supporting synchronization of the new data type. All told, existing synchronization products today assume that users will only perform point-to-point (i.e., two device) synchronization, such as between a hand-held device and a desktop application running on a PC.

This assumption is far removed from reality, however. Users are more likely today to have data among multiple devices, such as among a desktop computer, a server computer (e.g., company network at the user's place of employment), and two or more portable devices (e.g., a laptop computer and a hand-held device). Given the substantial effort required to manually keep three or more devices synchronized, the benefits of synchronization largely remain unrealized for most computer and information application users today.

What is needed is a system providing methods which allows a user of information processing devices to synchronize user information, such as user-supplied contact lists, from one device to any number of other devices, including three or more devices concurrently. The present invention fulfills this and other needs.

SUMMARY OF THE INVENTION

The present invention introduces the notion of a reference database: the Grand Unification Database or GUD. By storing the data that is actually being synchronized (i.e., storing the actual physical body of a memo, for instance) inside an extra database (or by specially-designated one of the client data sets) under control of a central or core synchronization engine, rather than transferring such data on a point-to-point basis, the system of the present invention provides a repository of information that is available at all times and does not require that any other synchronization client (e.g., PIM client or hand-held device) be connected. Suppose, for instance, that a user has two synchronization clients: a first data set residing on a desktop computer and a second data set residing on a hand-held device. The GUD introduces a third data set, a middleware database. This third data set provides a super-set of the other two client data sets. Therefore, if the user now includes a third client, such as a server computer storing user information, the synchronization system of the present invention has all the information necessary for synchronizing the new client, regardless of whether any of the other clients are currently available. The system can, therefore, correctly propagate information to any appropriate client without having to "go back" to (i.e., connect to) the original client from which that data originated.

Internally, the system of the present invention employs "type plug-in" modules, each one for supporting a particular data type. Since the core synchronization engine treats data generically as "blob" objects, type-specific support is provided by the corresponding plug-in module. Each plug-in module is a type-specific module having an embedded record API (application programming interface) that each synchronization client may link to, for providing type-specific interpretation of blob data. For instance, the system may include one type-specific record API for contact information, another for calendar information, and yet another for memo information. In this manner, each client may employ a type-specific API for correctly interpreting and processing particular blob data. The engine, on the other hand, is concerned with correct propagation of data, not interpretation of that data. It therefore treats the data itself generically. In this fashion, the present invention provides a generic framework supporting concurrent synchronization of an arbitrary number of synchronization clients or devices.

Also internally, the synchronization system of the present invention employs an "action queue," for optimizing the actual synchronization work performed. In contrast to conventional point-to-point (i.e., binary) synchronization systems, the synchronization system of the present invention does not immediately transmit updates or changes as soon as they are detected. Instead, the system determines or tabulates changes, net of all clients, before undertaking the actual work (e.g., record insertion) of synchronizing a particular client. In particular, all actions or tasks which are to be performed for a client by the system during synchronization are queued in the outbound action queue. This allows the system to apply synchronization logic or intelligence to the queue for further improving system performance, such as eliminating any activities which are redundant or moot. For example, if the system receives a request from two different clients to update a given record (i.e., conflict), the system, applying internal synchronization logic, can eliminate propagating the first update, as it is rendered moot by the second update. In this manner, the system can apply a first-level resolution of requests that are conflicting (or complimentary) and, as a result, eliminate those synchronization activities which are redundant or moot.

An exemplary method for synchronizing multiple data sets includes first establishing a data repository for facilitating synchronization of user information maintained among multiple data sets, the data repository storing user information from the data sets. At least one mapping is stored which specifies how user information may be transformed for storage at a given data set. Upon receiving a request for synchronizing at least one data set, the system may, based on user information stored at the data set(s) and based on the mapping, propagate to the data repository from each data set(s) any changes made to the user information, to the extent that such changes can be reconciled with user information already present at the data repository. Further, based on user information stored at said data repository and based on the mapping, the system may propagate to each data set(s) any changes to the user information which have been propagated to the data repository, to the extent that such changes are not present at the data set.

DETAILED DESCRIPTION OF A PREFERRED EMBODIMENT

The following description will focus on the presently-preferred embodiment of the present invention, which is operative in an environment typically including desktop computers, server computers, and portable computing devices, occasionally or permanently connected to one another, where synchronization support is desired. The present invention, however, is not limited to any particular environment or device. Instead, those skilled in the art will find that the present invention may be advantageously applied to any environment or application where contemporaneous synchronization among an arbitrary number of devices (i.e., "synchronization clients"), especially three or more devices, is desirable. The description of the exemplary embodiments which follows is, therefore, for the purpose of illustration and not limitation.

System Hardware and Software

Figure 1A:
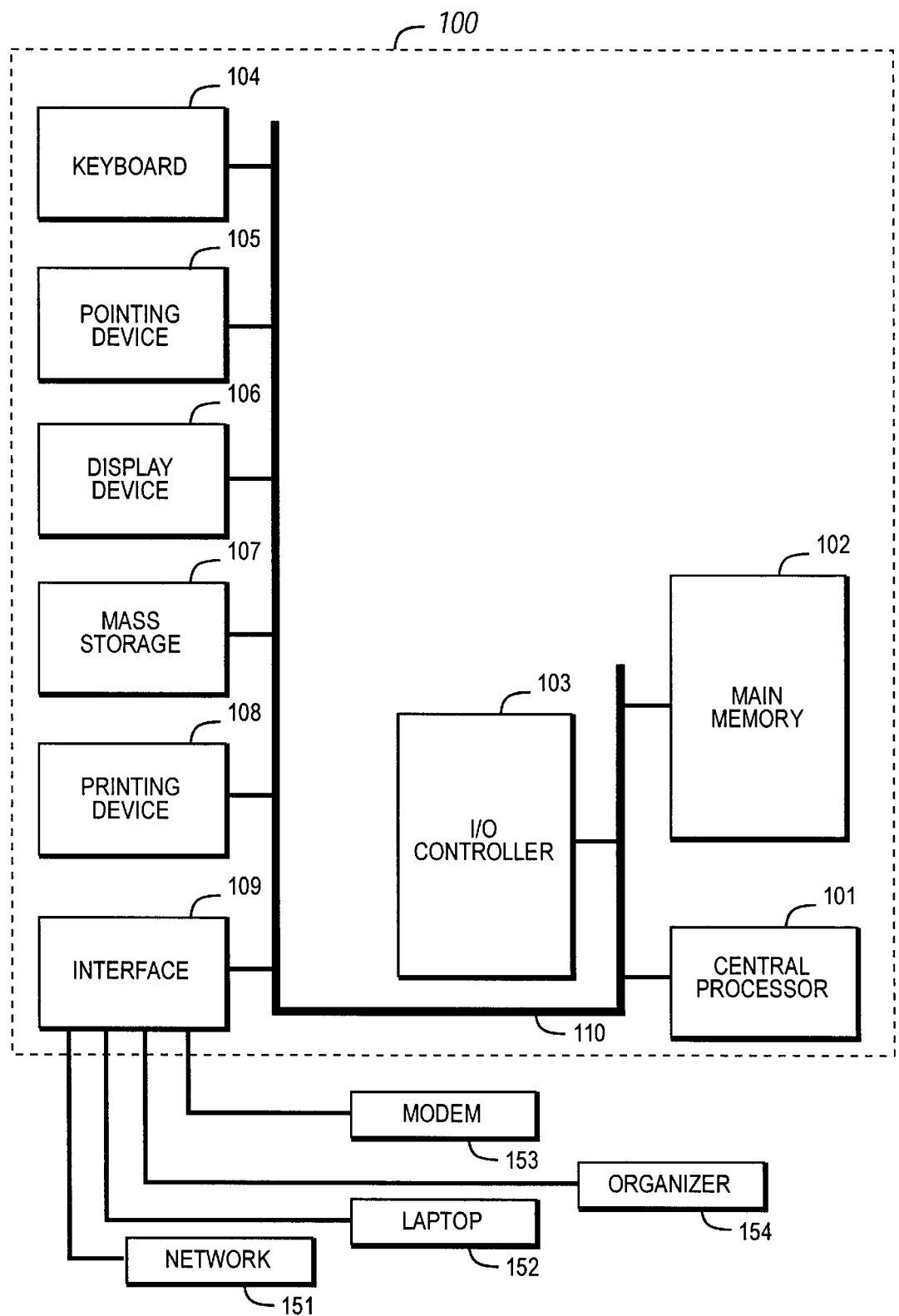
FIG. 1A is a block diagram of a computer system in which the present invention may be embodied.

The present invention may be embodied on an information processing system such as the system 100 of FIG. 1A, which comprises a central processor 101, a main memory 102, an input/output (I/O) controller 103, a keyboard 104, a pointing device 105 (e.g., mouse, pen device, or the like), a screen or display device 106, a mass storage 107 (e.g., hard disk, removable floppy disk, optical disk, magneto-optical disk, flash memory, or the like), one or more optional output device(s) 108, and an interface 109. Although not shown separately, a real-time system clock is included with the system 100, in a conventional manner. The various components of the system 100 communicate through a system bus 110 or similar architecture. In addition, the system 100 may communicate with other devices through the interface or communication port 109, which may be an RS-232 serial port or the like. Devices which will be commonly connected to the interface 109 include a network 151 (e.g., LANs or the Internet), a laptop 152, a handheld organizer 154 (e.g., the REX™ organizer, available from Franklin Electronic Publishers of Burlington, N.J.), a modem 153, and the like.

In operation, program logic (implementing the methodology described below) is loaded from the storage device or mass storage 107 into the main memory 102, for execution by the processor 101. During operation of the program (logic), the user enters commands through the keyboard 104 and/or pointing device 105 which is typically a mouse, a track ball, or the like. The computer system displays text and/or graphic images and other data on the display device 106, such as a cathode-ray tube or an LCD display. A hard copy of the displayed information, or other information within the system 100, may be obtained from the output device 108 (e.g., a printer). In a preferred embodiment, the computer system 100 includes an IBM PC-compatible personal computer (available from a variety of vendors, including IBM of Armonk, N.Y.) running Windows 9x or Windows NT (available from Microsoft Corporation of Redmond, Wash.). In a specific embodiment, the system 100 is an Internet or intranet or other type of network server and receives input from and sends output to a remote user via the interface 109 according to standard techniques and protocols.

Figure 1B:
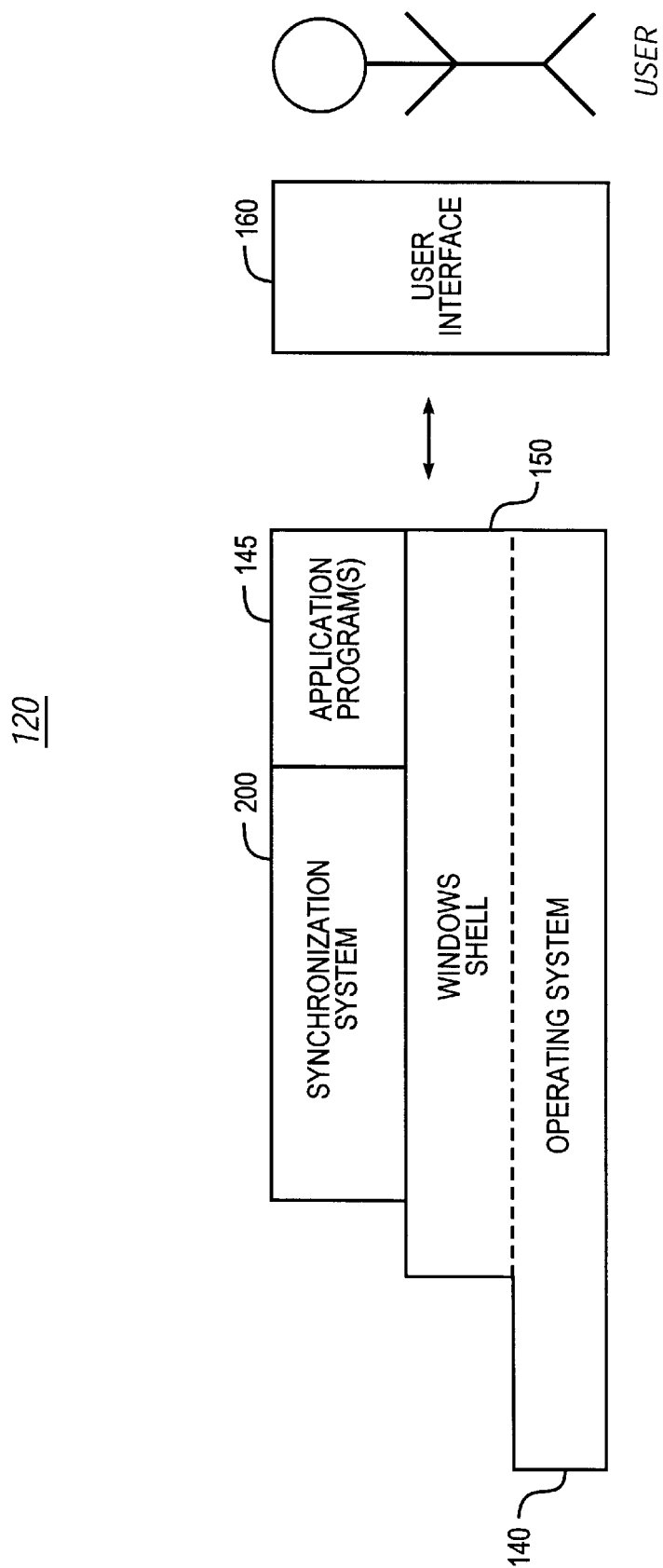
FIG. 1B is a block diagram of a software system of the present invention for controlling operation of the system of FIG. 1A.

Illustrated in FIG. 1B, a computer software system 120 is provided for directing the operation of the computer system 100. Software system 120, which is stored in system memory 102 and on storage (e.g., disk memory) 107, includes a kernel or operating system (OS) 140 and a windows shell 150. One or more application programs, such as client application software or "programs" 145 may be "loaded" (i.e., transferred from storage 107 into memory 102) for execution by the system 100.

System 120 includes a user interface (UI) 160, preferably a Graphical User Interface (GUI), for receiving user commands and data and for producing output to the user. These inputs, in turn, may be acted upon by the system 100 in accordance with instructions from operating system module 140, windows module 150, and/or client application module (s) 145. The UI 160 also serves to display the user prompts and results of operation from the OS 140, windows 150, and application(s) 145, whereupon the user may supply additional inputs or terminate the session. In the preferred embodiment, OS 140 and windows 150 together comprise Microsoft Windows software (e.g., Windows 9x or Windows NT). Although shown conceptually as a separate module, the UI is typically provided by interaction of the application modules with the windows shell and the OS 140.

Of particular interest herein is a synchronization system or "Synchronizer" 200 of the present invention, which implements methodology for contemporaneous synchronization of an arbitrary number of devices or "clients." Before describing the detailed construction and operation of the Synchronizer 200, it is helpful to first briefly review the basic application of synchronization to everyday computing tasks.

Brief Overview of Synchronization

A. Introduction

Many software applications, such as personal productivity applications as Starfish Sidekick® and Lotus® Organizer, have sets of data or "data sets" (e.g., address books and calendars). Consider for instance a user scenario where an account executive needs to coordinate contacts and events with other employees of the XYZ corporation. When traveling, this executive carries a laptop PC with Starfish Sidekick® installed. At home, she and her husband use Lotus® Organizer to plan their family's activities. When on family outings, the account executive carries her PalmPilot™ hand-held organizer. As the foregoing illustrates, a user often needs a means for synchronizing selected information from the data sets his or her applications rely upon. The account executive would not want to schedule a business meeting at the same time as a family event, for example.

Conventionally, the process of synchronizing or reconciling data sets has been a binary process—that is, two logical data sets are synchronized at a time. Any arbitrary synchronization topology will be supported. Here, the system guarantees synchronization stability and the avoidance of undesirable side effects (cascading updates, record duplication, or the like). Data sets do not need to be directly connected but, instead, can be connected via a "store-and-forward" transport, such as electronic mail.

B. Synchronization Design

1. Synchronization Type

Data set synchronization may, for convenience of description, be divided into two types: content-oriented and record-oriented. Content-oriented synchronization correlates data set records based on the values of user-modifiable fields. Value correlation requires semantic (or at least advanced syntactic) processing that the human brain is very good at and computers are not. For example, a record in one data set with a name field valued "Johann S. Bach" and a record in a second data set with a name field valued "J. S. Bach" could possibly refer to the same real-world person. A human being might arrive at this conclusion by correlating associated data (addresses) or drawing upon external information (e.g., Bach is an unusual name in the U.S.). Creating program logic or code with the ability to make these type of decisions is computationally very expensive.

Record-oriented synchronization correlates data set records by assuming that each record can be uniquely identified throughout its lifetime. This unique identifier is usually implemented as a non-modifiable, hidden field containing a "Record ID". Record-oriented synchronization algorithms usually require maintaining a mapping from one set of record IDs to another. In a preferred embodiment, the system employs record-oriented synchronization.

Record-oriented synchronization is conceptually simple and may be summarized as follows. In the rules below, A and B refer to two data sets which have a synchronization relationship. The rules are assumed to be symmetrical.

1. A and B must track similar types of data (e.g., if A is an address book, then B must be an address book).
2. A record entered in A, will create a record in B.
3. A record modified in A, will modify the corresponding record in B.
4. If record A1 has been modified in A and the corresponding record B1 has been modified in B, the record with the latest timestamp takes precedence.

The rules presented above reduce the occurrence of undesirable side effects with a network of synchronized data sets.

2. Timestamps

The actual synchronization logic in synchronization systems often needs to make processing decisions based on comparing the time at which past events occurred. For example, it is necessary to know if a record was modified before or after the last synchronization transaction. This requires recording the time of various events. A "timestamp" value may be employed to this purpose. Typically, data sets involved in synchronization support timestamps, or can be supplied with suitable timestamps, in a conventional manner. In conjunction with the usage of timestamps to compare the relative timing of record creation or modification, the clocks on the respective devices may themselves be synchronized.

3. Record Transformations

During synchronization, a synchronization system will typically transform records from one application-usage-schema set to another application-usage-schema set, such as transforming from a Starfish Sidekick® card file for business contacts to a corresponding PalmPilot™ data set. Typically, there is a one-to-one relationship between records in these two data sets, that is, between the source and target data sets. If this is not the case, however, the component of the system that interacts with a non-conforming data set may include logic to handle this non-conformance.

The record transformations themselves are a combination of field mappings and conversions from a source record to a target record. Exemplary types of field mappings include, for instance, the following.

1. Null Source field has no equivalent field in the target data set and is ignored during synchronization.
2. One-to-One Map exactly one field in the target to one field in the source.
3. One-to-Many Map one field in the target to many fields in the source, such as parse a single address line to fields for number, direction, street, suite/apartment, or the like.
4. Many-to-One Map several fields in the target to one field in the source, such as reverse the address line mapping above.

Similarly, exemplary field conversions may be defined as follows.

1. Size Source field may be larger or smaller in size than the target field.
2. Type Data types may be different, such as float/integer, character vs. numeric dates, or the like.
3. Discrete Values A field's values may be limited to a known set. These sets may be different from target to source and may be user defined.

It is often the case that there are significant differences in the number, size, type and usage of fields between two data sets in a synchronization relationship. The specification of transformations is typically user-configurable, with the underlying system providing defaults.

With an understanding of the basic process of synchronizing information or computing devices, the reader may now better appreciate the teachings of the present invention for providing improved methodology for contemporaneous synchronization of an arbitrary number of devices (i.e., synchronization clients). The following description focuses on specific modifications to a synchronization system for implementing the improved synchronization methodology.

Synchronization System Providing Contemporaneous Synchronization of two or more Clients A. General Design Considerations The present invention introduces the notion of a "Grand Unification Database" (GUD)—a central repository or reference database for user data. By storing the data that is actually being synchronized (i.e., storing the actual physical body of a memo, for instance) inside an extra database (or by specially-designated one of the client data sets) under control of a central or core synchronization engine, rather than transferring such data on a point-to-point basis, the system of the present invention provides a repository of information that is available at all times and does not require that any other synchronization client (e.g., PIM client or hand-held device) be connected. Suppose, for instance, that a user has two synchronization clients: a first data set residing on a desktop computer and a second data set residing on a hand-held device. The GUD introduces a third data set, a middleware database. This third data set provides a super-set of the other two client data sets. Therefore, if the user now includes a third client, such as a server computer storing user information (or other information which the user desires synchronization to), the synchronization system of the present invention has all the information necessary for synchronizing the new client, regardless of whether any of the other clients are currently available. The system can, therefore, correctly propagate information to any appropriate client without having to "go back" to (i.e., connect to) the original client from which that data originated.

Internally, the system of the present invention employs a driver-based architecture providing type-specific "plug-in" modules, each one for supporting a particular data type. Since the core synchronization engine treats data generically as "blob" objects, type-specific support is provided by the corresponding plug-in module. Each plug-in module is a type-specific module having an embedded record API (application programming interface) that each synchronization client may link to, for providing type-specific interpretation of blob data. For instance, the system may include one type-specific record API for contact information, another for calendar information, and yet another for memo information. In this manner, each client may employ a type-specific API for correctly interpreting and processing particular blob data. The engine, on the other hand, is concerned with correct propagation of data, not interpretation of that data. It therefore treats the data itself generically. In this fashion, the present invention provides a generic framework supporting concurrent synchronization of an arbitrary number of synchronization clients or devices.

Also internally, the synchronization system of the present invention employs an "action queue," for optimizing the actual synchronization work performed. In contrast to conventional point-to-point (i.e., binary) synchronization systems, the synchronization system of the present invention does not immediately transmit updates or changes as soon as they are detected. Instead, the system determines or tabulates changes, net of all clients, before undertaking the actual work (e.g., record insertion) of synchronizing a particular client. In particular, all actions or tasks which are to be performed for a client by the system during synchronization are queued in the outbound action queue. This allows the system to apply synchronization logic or intelligence to the queue for further improving system performance, such as eliminating any activities which are redundant or moot. For example, if the system receives a request from two different clients to update a given record (i.e., conflict), the system, applying internal synchronization logic, can eliminate propagating the first update, as it is rendered moot by the second update. In this manner, the system can apply a first-level resolution of requests that are conflicting or complementary and, as a result, eliminate those synchronization activities which are redundant or moot.

B. Overview of Synchronization System Internal Architecture

Figure 2:
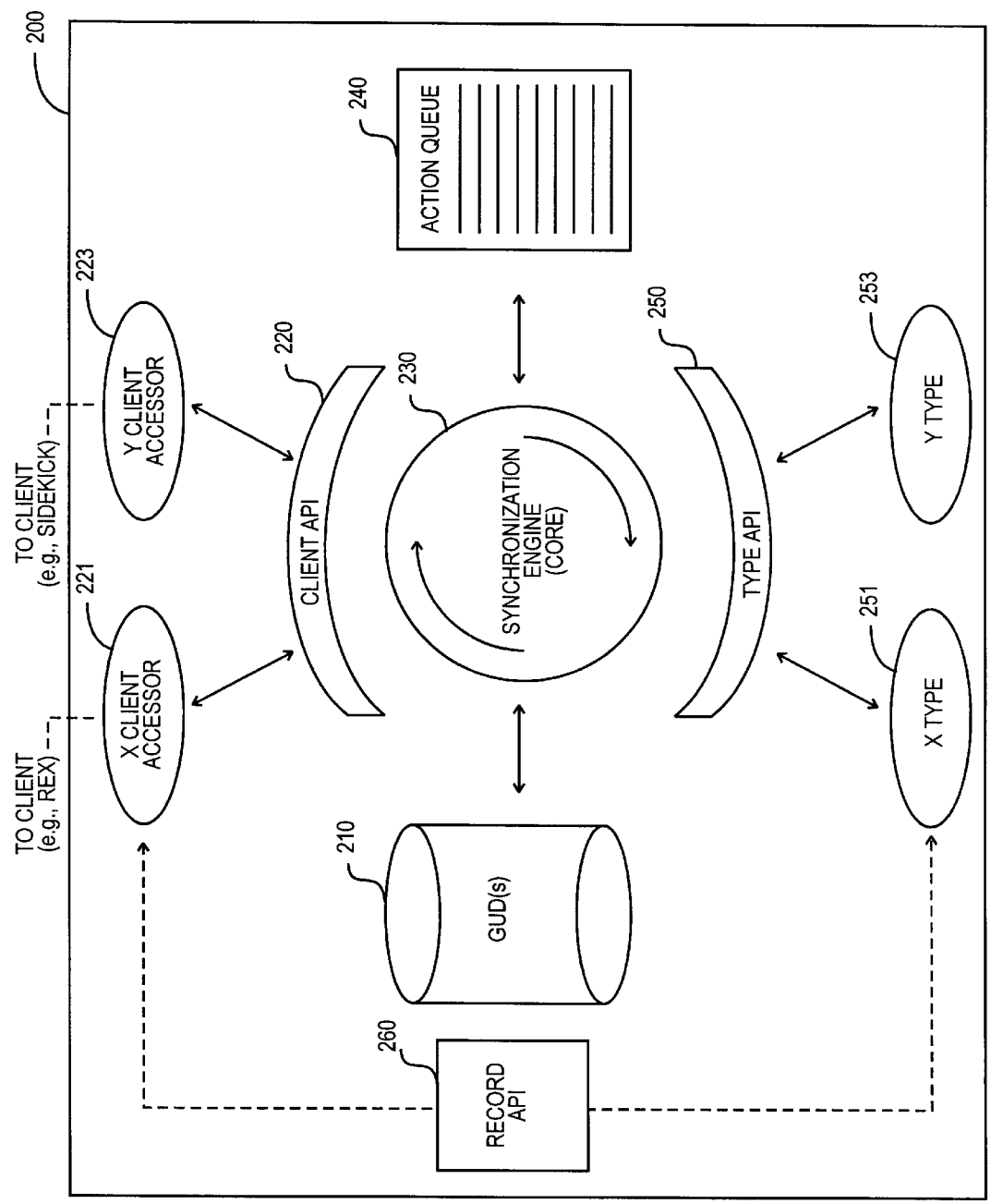
FIG. 2 is a block diagram of the synchronization system of the present invention.

FIG. 2 is a block diagram illustrating a modular or high-level view of the synchronization system 200. As shown, the synchronization system 200 includes a synchronization engine (core) 230 that is connected to both a Grand Unification Database(s) (GUD(s)) 210 and to an action queue 240. As also shown, the engine presents two interfaces, a client API 220 and type API 250, for communicating with components outside the core engine.

The GUD 210, as previously described, serves as a central repository storing record data and mappings which dictate how records are transformed (i.e., from one data set to another). The synchronization engine 230 includes generic logic for managing the GUD 210, including locating and interpreting information in the GUD. Based on the information in the GUD 210 and client requests, the synchronization engine 230 builds the action queue 240, adding or removing specific tasks from the queue as necessary for carrying out synchronization transactions. The action queue 240 itself is an array of task entries; it may grow or shrink, depending on the current number of entries that it stores. In the currently-preferred embodiment, the array is sorted by record ID, that is, according to the record ID of the corresponding record from the GUD. Since entries are sorted by record ID, the task of identifying entries in conflict is simplified.

To communicate with the clients, the synchronization engine 230 employs the client API 220. The client API provides database engine-like functionality. For example, API function calls are provided for moving to records, reading records, and writing records. In the currently-preferred embodiment, clients accessors 221, 223 are "accessor" portions of the synchronization system which, in turn, communicate directly with the "real" clients, such as REX. By implementing its architecture such that all clients communicate commonly through the client API 220, the system 200 provides plug-in capability for supporting new clients.

In order for the system to correctly determine record information in the GUD 210, the synchronization engine 230 communicates with type drivers or modules (e.g., X type 251 and Y type 253) through the type API 250. As previously described, each type, such as calendar, contacts, and the like, is associated with a particular type module. The type API 250 allows the synchronization engine 230 to ask common questions about information stored in the GUD 210. For example, if the synchronization engine 230 needs to determine whether two records are identical, it can request a record comparison operation by the corresponding type module, using the type API 250. In comparison to the client API 220, the type API 250 is comparatively small. By implementing its architecture such that all type-specific requests are communicated commonly through the type API 250, the system 200 provides built-in extensibility. When support is desired for a new type, one need only plug in a new type module. Any client which wants to communicate with that new type now has automatically gained support for that new type. In the currently-preferred embodiment, a type module is unaware of any specific clients which it supports. Clients, on the other hand, typically know what types that each desires to synchronize with.

As also shown, each client accessor can communicate directly with the type modules, using a record API 260. In the currently-preferred embodiment, each type module surfaces its own record API, such as record API 260 for type module 251. The underlying record API is specific for each type. Each accessor communicates with a desired type module, not through the synchronization engine 230, but instead through the exposed record API for the desired type. Thus, in effect, there is a direct communication path between client accessors and type modules. In typical use, the record API is employed by a client accessor to create or write record-specific information. For example, if the client desires to write a "subject" for a contact record, the client, operating through the corresponding client accessor, can invoke the corresponding record API for requesting this service. In response to invocation of the record API, the corresponding type module would service the API call for assisting with creating or editing the underlying record, in the matter requested by the client. The actual work of creating or editing the record is typically performed by the client; however, the corresponding type module returns specific information about the given type, so that the client knows exactly how the record is structured. As a simple example, the record API might return information indicating that a particular record type consists of a structure having four string data members, each being 64 bytes long. Based on such information, the client now knows how to interpret and process that type.

C. Synchronization System Detailed Internal Architecture

1. GUD

Figure 3:
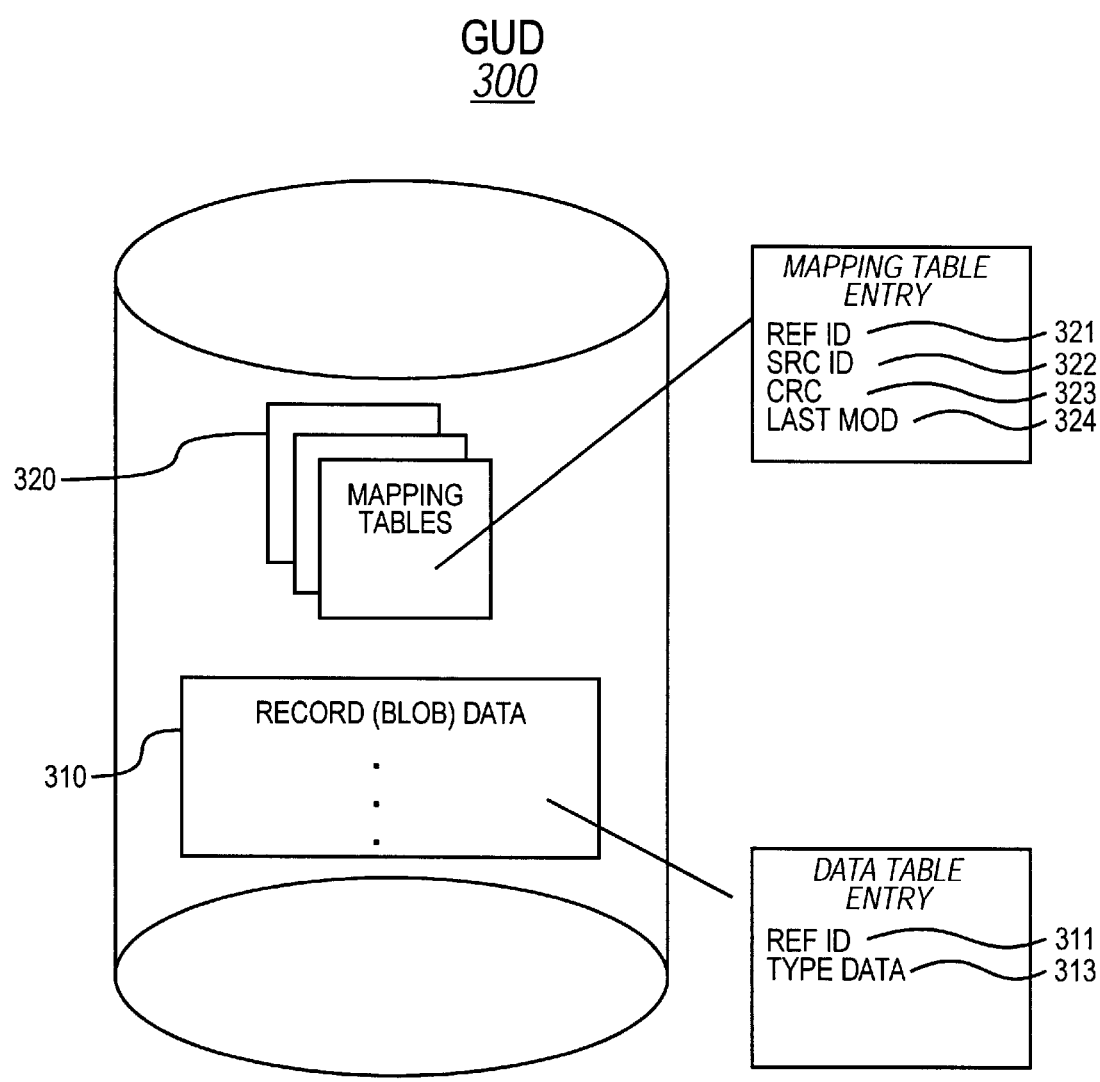
FIG. 3 is a block diagram of a GUD of the present invention.

FIG. 3 is a block diagram illustrating organization of a GUD 300. In the currently-preferred embodiment, the system implements one GUD per type. For instance, if one were synchronizing contacts, calendars, and "to do"s (i.e., task-oriented information), one would have three GUDs, one for each type. As shown, each GUD database internally stores two sets of tables: mapping tables 320 and data table 310. The data table 310 stores the actual record data 313 (i.e., blob data), together with a unique reference (ref) ID or "GUD ID" 311. In the presently-preferred embodiment, each reference ID (e.g., a 32-bit or 64-bit ID) is unique not only within its particular GUD database but also across all GUD databases. Thus, for example, the system would not duplicate a calendar reference ID in the contact GUD database. With this approach, the individual data items are uniquely identified across the entire system. If desired, the GUD itself (or its data record portion) may be implemented as one of the actual client data sets (i.e., one of the data sets serves as the GUD, or portion thereof).

Also shown, mapping tables 320 store entries comprising a reference ID 321, a source ID 322, a checksum or integrity value (e.g., CRC) 323, and a last modification (mod) timestamp 324. The reference ID 321 is the same ID as associated with a record in the data table 310. The source ID 322 is the record ID for the record, as it was received from the client. The last modification timestamp 324 establishes when the record was last synchronized through the system. The timestamp (e.g., system time structure) reflects the time on the system clock of the machine which is being synchronized. Optionally, the system stores a comparison value or checksum (e.g., cyclic redundancy checking or CRC) 323, for use with those clients that do not support timestamps. If the checksum is not used, the system stores 0 as its value.

Each table itself is linked to a particular client, through a table ID, with the correspondence being stored as configuration information (which in the currently-preferred environment exists as a higher level than the synchronization engine). In this manner, each one of the mapping tables can be associated with an appropriate client. The end result is that the system maintains a mapping table for each client. Thus, for a given record ID, the system can easily determine (from the above-described reference ID-to-source ID correspondence) where that record maps to for all clients. Consider, for instance, a particular record residing on a REX device. Based on the source ID for that record, the system can determine from the mapping table the corresponding mapping table item for that source ID. Now, the system has sufficient information allowing the particular record to be synchronized, as required by the user. When the data is completely synchronized with all clients, all mapping tables in the system will store that record ID (i.e., the record ID is now common to all tables once the data is completely synchronized with all clients).

2. Action Queue

The action queue stores entries of a particular action type, which are used during synchronization to indicate all actions needed to be performed by the system. In the currently-preferred embodiment, six action types are defined:

(1) $GUD_{13}UPDATE$
(2) $GUD_{13}ADD$
(3) $GUD_{13}DELETE$
(4) $CLIENT_{13}UPDATE$
(5) $CLIENT_{13}ADD$
(6) $CLIENT_{13}DELETE$

The first three action types or "GUD action types" indicate actions to be performed against the GUD. For example, if the system receives a new record from a client, it must add the new record to the (corresponding) GUD; this is indicated by an action queue entry having a type of $GUD_{13}ADD$. In operation, the system will not only add the record to the corresponding GUD but, also, will eventually add that record to other clients which are associated with that record as well (unless the user instructs otherwise). In a similar manner, a $GUD_{13}UPDATE$ action item or command will result in the system updating the corresponding GUD for a given record (e.g., as a result of that record having been modified at the client), and a $GUD_{13}DELETE$ action item or command will result in the system deleting the record from the corresponding GUD (e.g., as a result of that record having been deleted at the client).

The CLIENT action types are used to indicate particular synchronization work which is required to be performed for a particular client. Suppose, for instance, that the synchronization engine determines that the REX client needs to be updated, as a result of actions undertaken by other clients; the REX client need not be currently available (e.g., need not be currently connected to the system). In such a case, the engine can post to the action queue appropriate action entries for indicating the synchronization work which is required to be performed the next time the REX client is connected. In a manner similar to that described above for the GUD, the system can specify an update ($CLIENT_{13}UPDATE$), add ($CLIENT_{13}ADD$), and/or delete ($CLIENT_{13}DELETE$) action, on a per client basis. In the instance of an update or delete action, there already exists a corresponding mapping table item. For an add action, however, the system undertakes as its first action item the task of creating a new mapping table item. Therefore, when the add action is eventually performed, the table item will be created as well. On the other hand, should the action be canceled, the mapping table item will not be created.

Additional pieces of information are tracked by each entry in the action queue: (1) record data, (2) source client, and (3) timestamp. The record data is the actual data (or a reference to the actual data) obtained from the client. In this manner, the actual data may be associated with a particular action. The source client indicates which client the action originated from. This is useful, for instance, during synchronization, so that the system does not attempt to synchronize the client from which the data just arrived. The timestamp stored in an action queue entry is the last modification time of the record from the source client. This is stored for possible use during conflict resolution (which is described in further detail below).

As previously described, the entries in the action queue are sorted by reference ID. In this manner, the system can quickly determine action queue entries which are potentially in conflict. For example, if the queue contains three entries all having the same reference ID, the system must examine those entries for uncovering any conflicts. The actual conflict resolution rules applied in the system are described below.

3. Methodology of System Operation

Figure 4A:
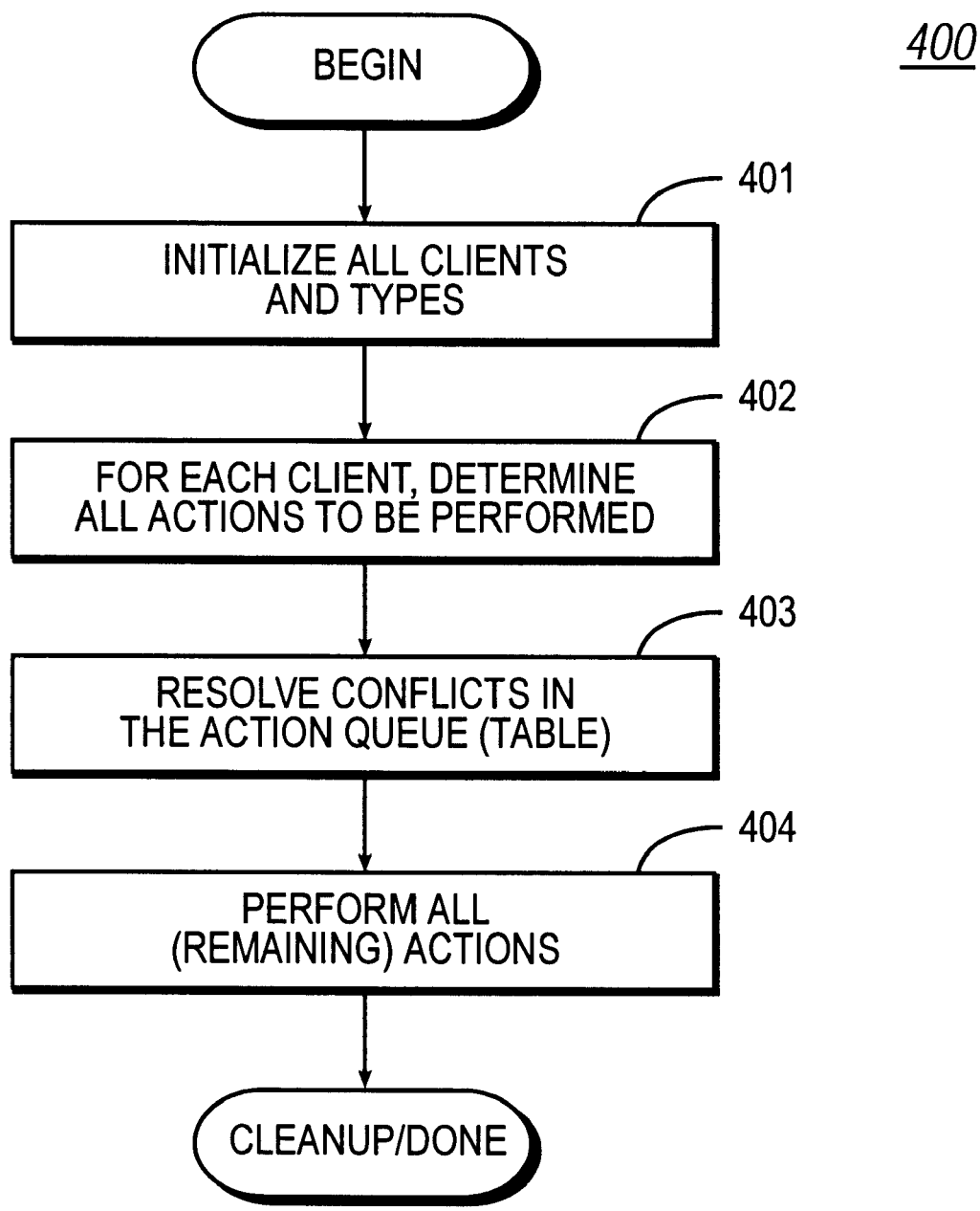
FIGS. 4A–C are flow charts of the operation of the synchronization system of the present invention.

FIG. 4A illustrates an overall methodology 400 of the present invention for providing synchronization contemporaneously among an arbitrary number of clients. At step 401, the system initializes all clients and types (data structures). At step 402, the system establishes a loop for determining for each client what actions are to be performed. Here, the system begins building the action queue. Once the action queue or table has been built, the system proceeds to resolve any conflicts present. This is indicated by step 403. In particular at this step, the system performs housekeeping on the queue, removing any action entries which are unnecessary.

Conflict resolution requires further explanation. As previously described, the entries in the action queue are sorted by reference ID. In this manner, the system can quickly determine action queue entries which are potentially in conflict. For example, if the queue contains three entries all having the same reference ID, the system must examine those entries for uncovering any conflicts. Not only are items in the action queue sorted by a reference ID but, as a second level of ordering, they are also sorted by action. GUD updates are always sorted to the top, thus establishing their priority over other types. Now, the following exemplary conflict resolution rules may be applied:

Rule 0: GUD__UPDATE +
    <entry(ies) other than GUD__UPDATE>
    GUD__UPDATE wins; delete all others
Rule 1: GUD__UPDATE +
    GUD__UPDATE
    GUD__UPDATE with greatest timestamp wins (or display UI)

-continued

```
Rule 2:  GUD_UPDATE +
         GUD_DELETE
         GUD_UPDATE (take data over non-data)
Rule 3:  CLIENT_UPDATE +
         CLIENT_UPDATE (from another client)
         Leave both (i.e., same)
```

Once conflicts have been resolved the action queue is ready for use. Specifically, at step 404, the system processes all remaining action entries in the action queue. The actions themselves are performed on a transaction-level basis, where a transaction comprises all actions performed on a given record GUD ID. Thereafter, the system may perform cleanup, including closing any open databases and freeing any initialized data structures (e.g., type).

Figure 4B:
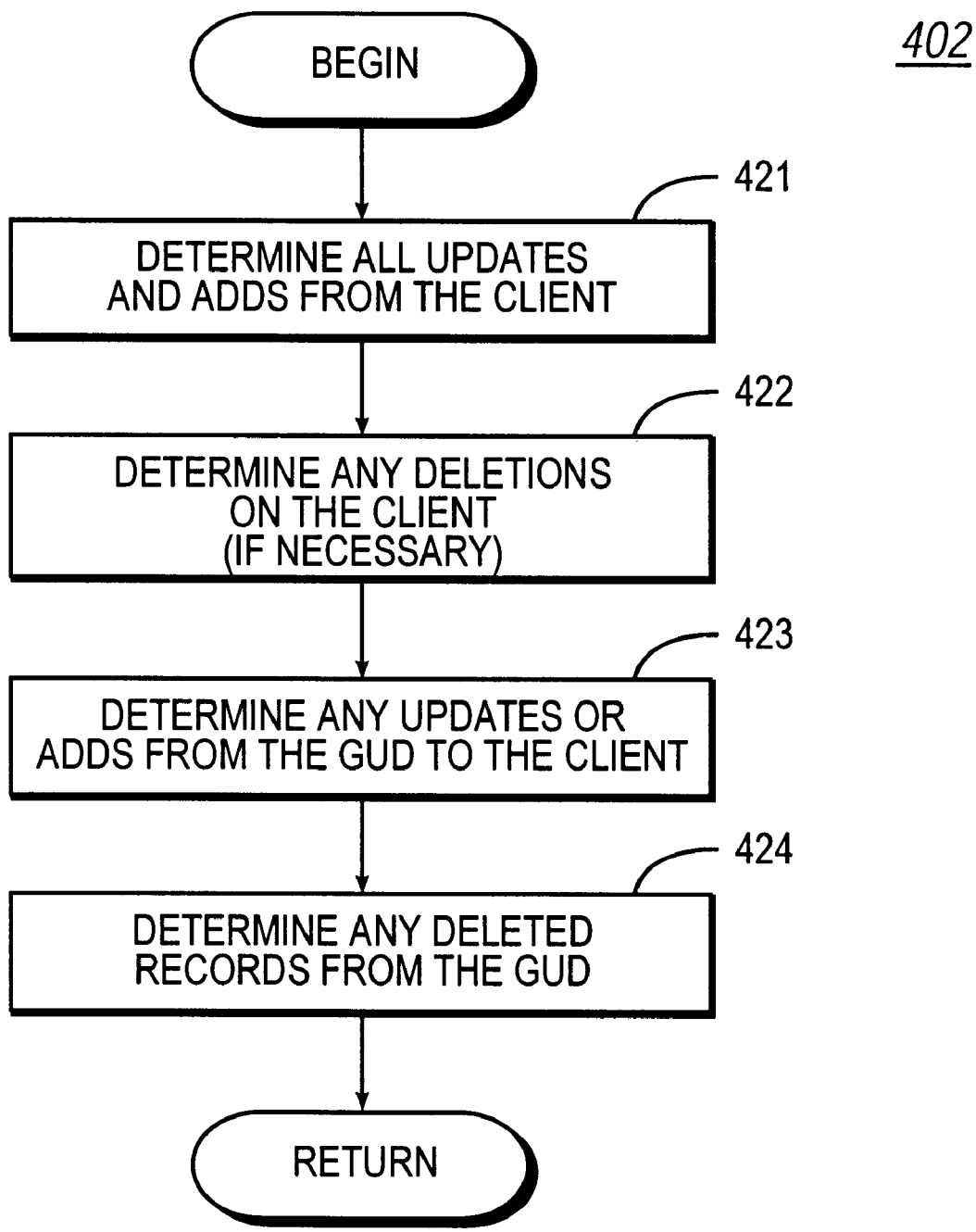

FIG. 4B illustrates particular substeps which are performed in conjunction with step 402. The substeps are as follows. At step 421, the system determines all updates and adds originating from the client (i.e., the client currently being processed during the "for" loop). In essence, the system operates by asking the client for all modifications (e.g., updated or added records) since last synchronization. Once these are learned, the system places them in the action queue, either as a $GUD_{13}UPDATE$ or $GUD_{13}ADD$. If desired, a filter may be applied at this point, for filtering out any records which are desired to be omitted from the synchronization process. The next step, at step 422, is for the system to determine any deletions coming from the client. Note, here, that the update/add step (421) comes before the deletion determination step (422). This allows the system to determine what is new before determining what has been deleted. As an optimization at this point, the system can look at the record count at the client for determining whether in fact there have been any deletions at all. In the event that the count indicates no deletions, the system can eliminate the time-consuming process of determining deletions (which may require the system to examine numerous records individually). At step 423, the system makes a reverse determination: determining any updates or adds which need to be sent from the GUD back to the client. The mapping table stores a timestamp indicating when the client was last synchronized as well as a timestamp for each record item. Accordingly, the system can determine whether the item needs to be updated or added at the client. In the currently-preferred embodiment, the timestamp is generated based on the system clock of the client which is undergoing synchronization. Finally, at step 424, the system determines any deleted records in the GUD, for indicating which corresponding records should be deleted from the client. Specifically in the mapping table, each entry includes a deletion flag which may be set for indicating deletion of the corresponding record. These foregoing steps are performed for all clients undergoing synchronization, until the action queue is filled with the appropriate action entries required for effecting synchronization.

Figure 4C:
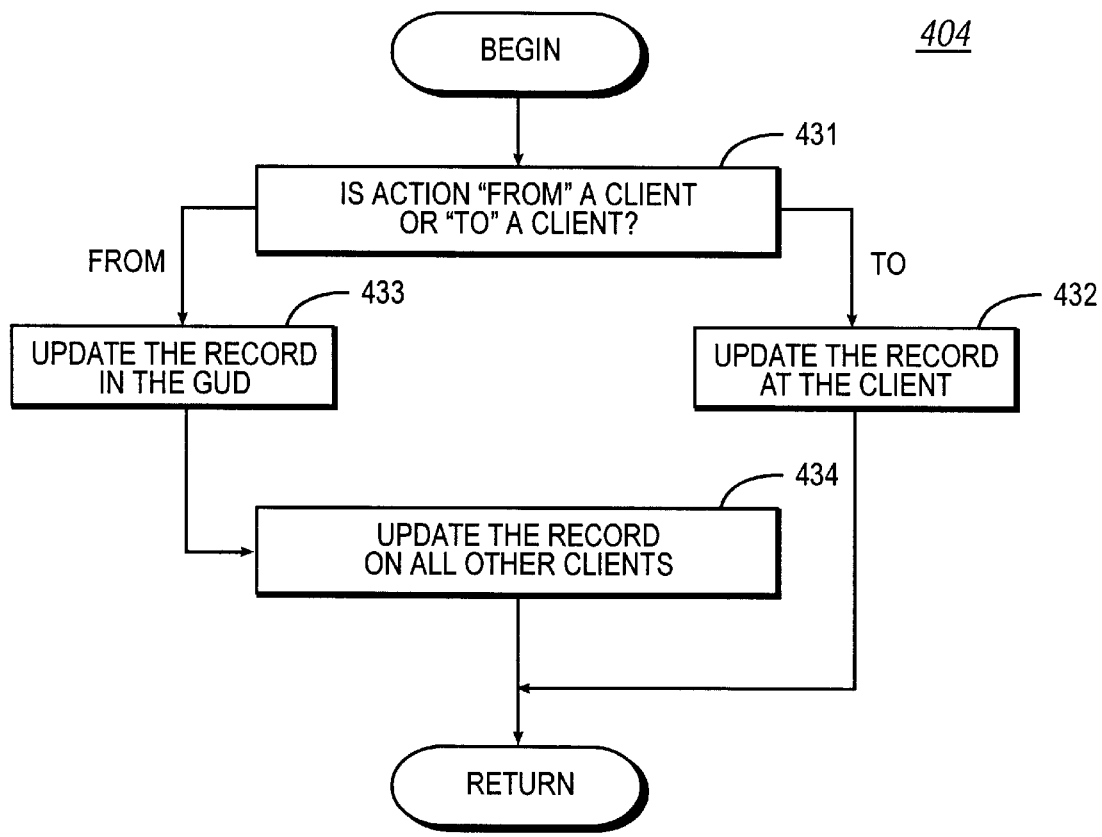

FIG. 4C illustrates particular substeps which are performed in conjunction with step 404. The substeps are as follows. At step 431, the system determines whether the action is from one client to another client. If the action is to a client, the system may simply proceed to update the client, as indicated by step 432. If, on the other hand, the action is from a client, the system must update the GUD, as indicated at step 433, and, in turn, propagate the update to the other clients, as indicated at step 434. The actual propagation is performed recursively invoking itself as client actions (rather than GUD actions). Here, the system fabricates a surrogate or fake action item which is then acted upon as if it were from the action queue. All the time during the method, the GUD has played an important role as a data source for those clients which are not currently available.

Appended herewith as an Appendix A are source code listings providing further description of the present invention.

While the invention is described in some detail with specific reference to a single-preferred embodiment and certain alternatives, there is no intent to limit the invention to that particular embodiment or those specific alternatives.

What is claimed is:

1. In a data processing environment, a method for synchronizing multiple data sets, the method comprising:

establishing a data repository for facilitating synchronization of user information maintained among multiple data sets, said data repository storing user information from the data sets;

storing at least one mapping which specifies how user information may be transformed for storage at a given data set;

receiving a request for synchronizing at least one data set;

based on user information stored at said at least one data set and based on said at least one mapping, propagating to the data repository from each of at said at least one data set any changes made to the user information, to the extent that such changes can be reconciled with user information already present at said data repository; and based on user information stored at said data repository and based on said at least one mapping, propagating to each of said at least one data set any changes to the user information which have been propagated to the data repository, to the extent that such changes are not present at said each data set;

wherein a particular one of the data sets resides on a client device which is intermittently connected, and wherein said steps of propagating are deferred for the particular data set until the client device is actually connected.

2. The method of claim 1, wherein said step of propagating to the data repository comprises:

performing selected operations of adding, updating, and deleting information at the data repository, so that the data repository reflects changes made to user information at the data sets.

3. The method of claim 2, wherein said operation of deleting information comprises a logical delete operation of marking information as having been deleted.

4. The method of claim 1, wherein said data repository stores user information that is a super-set of all user information stored at said multiple data sets.

5. The method of claim 1, wherein said data repository and said at least one mapping comprise a grand unification database, for facilitating synchronization among multiple data sets.

6. The method of claim 5, wherein one grand unification database is created for each type of user information which is to be synchronized.

7. The method of claim 6, wherein said environment includes types of user information selected from contact, calendar, and task-oriented information.

8. The method of claim 1, wherein each data set comprises a plurality of data records, and wherein each data record is represented within the data repository.

9. The method of claim 8, wherein each of said data records is represented within the data repository by a corresponding data record having a unique identifier.

10. The method of claim 1, wherein each mapping comprises a mapping table storing a plurality of mapping entries, each mapping entry storing at least a first identifier for indicating a particular data record in the data repository which the entry is associated with, and a second identifier for indicating a particular data record at a particular data set which is the source for the user information.

11. The method of claim 10, wherein each mapping table is associated with a particular data set.

12. The method of claim 10, wherein each mapping entry stores particular information useful for determining when its associated user information was last modified.

13. The method of claim 12, wherein said particular information comprises a last-modified time stamp, derived at least in part from the client device where the associated user information was last modified.

14. The method of claim 12, wherein said particular information comprises a checksum value, for use with a data set residing at a client device that does not support time stamps.

15. The method of claim 1, wherein said step of propagating to each of said at least one data set comprises:

performing selected operations of adding, updating, and deleting information at each of said at least one data set, so that said each reflects changes made to user information at other data sets.

16. The method of claim 15, wherein said operation of deleting information comprises physically deleting information at said each data set.

17. The method of claim 8, wherein at least one of the said data sets functions, at least in part, as said data repository.

18. The method of claim 1, wherein user information is stored at the data repository as unformatted blob data.

19. The method of claim 18, further comprising:

providing at least one type module for facilitating interpretation of user information stored as unformatted blob data at the data repository.

20. A method for providing synchronization among an arbitrary number of clients, each client storing information in data records, the method comprising:

creating a reference database for storing a set of data records serving as a reference to corresponding data records stored at the clients;

creating a list of actions to perform, said list for storing instructions specifying that particular data records should be added, updated, or deleted at a particular client and storing instructions specifying that particular data records should be added, updated, or deleted at the reference database;

for each client,
 determining all data records which have been updated, added, or deleted at the client since the client was last synchronized;
 based on the data records determined to have been updated, added, or deleted at the client, posting to said list instructions to add, update, or delete corresponding data records stored at the reference database;

for each client,
 determining all data records which have been updated, added, or deleted at the reference database since the client was last synchronized;
 based on the data records determined to have been updated, added, or deleted at the reference database, posting to said list instructions to add, update, or delete corresponding data records stored at the client;

resolving any conflicts present in said list; and synchronizing the clients by performing instructions remaining in said list.

21. The method of claim 20, wherein said step of determining all data records which have been updated, added, or deleted at the client includes first determining all data records which have been updated and added, and thereafter determining all data records which have been deleted.

22. The method of claim 21, wherein said step of determining all data records which had been deleted includes:

first determining, based on record count, whether any records at all have been deleted.

23. The method of claim 20, wherein said resolving step includes:

prioritizing instructions in the list according to an action type; and removing from the list any instruction rendered moot as a result of a conflicting instruction having a higher type.

24. The method of claim 20, wherein said reference database comprises a data set at one of the clients.

25. The method of claim 20, wherein said the arbitrary number of clients comprise three or more clients.

26. The method of claim 20, wherein said list of actions includes instructions selected from a client update, a client add, and a client delete, for a given data record.

27. The method of claim 20, wherein said list of actions includes instructions selected from a reference database update, a reference database add, and a reference database delete, for a given data record.

28. The method of claim 20, wherein each data record stored at the reference database is uniquely identified, so that it may be tracked at each client.

29. The method of claim 20, wherein an instruction to update the reference database takes precedence over other instructions.

30. The method of claim 20, wherein said instruction to delete a corresponding data record at the reference database comprises a logical delete operation of marking the record as having been deleted.

31. The method of claim 20, wherein said instruction to delete a corresponding data record at a client comprises a physical delete operation.

32. The method of claim 20, wherein said determining steps include using a mapping table for transforming information to and from a particular client.

33. The method of claim 20, wherein at least one of the clients is intermittently connected, so that certain instructions in the list are not executed until the client is again connected.

34. The method of claim 20, wherein information from data records is stored at the reference database as unformatted blob data.

35. A synchronization system providing synchronization of information among an arbitrary number of client devices, each client device storing information in data records, the system comprising:

a reference database for storing a set of data records serving as a reference to corresponding data records stored at the client devices; and a synchronization engine for:
 constructing a list of actions to perform, said list for storing instructions specifying that particular data records should be added, updated, or deleted at a particular client device and storing instructions specifying that particular data records should be added, updated, or deleted at the reference database;

determining for each client device all data records which have been updated, added, or deleted at the client since the client was last synchronized, and based on that determination, posting to said list instructions to add, update, or delete corresponding data records stored at a reference database;

determining for each client device all data records which have been updated, added, or deleted at the reference database since the client was last synchronized, and based on that determination, posting to said list instructions to add, update, or delete corresponding data records stored at the client;

resolving any conflicts present in said list; and synchronizing the clients by performing instructions remaining in said list.

36. The system of claim 35, wherein said reference database comprises a super-set of data records from the client devices.

37. The system of claim 35, further comprising:

plug-in type drivers for allowing each client device to process information of a particular type.

38. The system of claim 35, further comprising:

a client interface allowing a particular client device to register with the synchronization engine for obtaining synchronization services.

39. The system of claim 35, further comprising:

a record interface allowing a particular client device to read and write information of a particular record type.

* * * * *